United States Patent
Sharma

(10) Patent No.: US 12,132,736 B2
(45) Date of Patent: Oct. 29, 2024

(54) COMMON ACCESS MANAGEMENT ACROSS ROLE-BASED ACCESS CONTROL AND ATTRIBUTE-BASED ACCESS CONTROL

(71) Applicant: Dell Products L.P., Round Rock, TX (US)

(72) Inventor: Sreenivas Sathyanarayana Sharma, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 415 days.

(21) Appl. No.: 17/506,298

(22) Filed: Oct. 20, 2021

(65) Prior Publication Data
US 2023/0122504 A1    Apr. 20, 2023

(51) Int. Cl.
*H04L 9/40*     (2022.01)
*H04L 12/46*    (2006.01)

(52) U.S. Cl.
CPC .................. *H04L 63/101* (2013.01)

(58) Field of Classification Search
CPC ................................... H04L 63/101
USPC ............................................ 726/4
See application file for complete search history.

(56) References Cited

U.S. PATENT DOCUMENTS

| | | | |
|---|---|---|---|
| 9,544,333 B2 * | 1/2017 | Walline | G06F 3/067 |
| 10,491,503 B2 * | 11/2019 | Petrick | H04L 41/0893 |
| 10,530,658 B2 * | 1/2020 | Dasar | H04L 41/0893 |
| 2013/0283350 A1 * | 10/2013 | Afek | G06F 21/6218 726/4 |
| 2015/0082377 A1 * | 3/2015 | Chari | H04L 63/20 726/1 |
| 2019/0362087 A1 * | 11/2019 | Ferrans | H04L 63/102 |
| 2019/0364051 A1 * | 11/2019 | Ferrans | G06F 16/9024 |
| 2020/0026338 A1 * | 1/2020 | Maddukuri | G06F 1/28 |
| 2020/0120098 A1 * | 4/2020 | Berg | H04L 63/104 |
| 2020/0202020 A1 * | 6/2020 | Ewing | G06F 21/31 |

(Continued)

FOREIGN PATENT DOCUMENTS

| | | | |
|---|---|---|---|
| CN | 101771683 A | * | 7/2010 |
| CN | 104732123 A | * | 6/2015 |

(Continued)

OTHER PUBLICATIONS

Steve Touw, Immuta, Modernizing From an RBAC to ABAC Model, Sep. 20, 2021, pp. 1-12 (Year: 2021).*

(Continued)

*Primary Examiner* — Haresh N Patel
(74) *Attorney, Agent, or Firm* — Terrile, Cannatti & Chambers, LLP; Emmanuel A. Rivera

(57) ABSTRACT

Described are a computer-implementable method, system and computer-readable storage medium for providing common identity and access management of applications based on role-based access control (RBAC) model and access-based control (ABAC) model. A common model based on the ABAC model is implemented to support RBAC workflows and ABAC workflows. An RBAC management user interface receives the RBAC workflows which are converted to an ABAC model structure and implemented by the common model. An ABAC management user interface receives the ABAC workflows and is implemented by the common model.

17 Claims, 5 Drawing Sheets

(56) References Cited

U.S. PATENT DOCUMENTS

| | | | |
|---|---|---|---|
| 2022/0021711 A1* | 1/2022 | Marsh | H04L 9/3247 |
| 2022/0075892 A1* | 3/2022 | Jayaram | G06Q 20/3829 |
| 2022/0156393 A1* | 5/2022 | Butcher | G06F 21/6218 |
| 2023/0122504 A1* | 4/2023 | Sharma | H04L 63/0263 |
| | | | 726/4 |

FOREIGN PATENT DOCUMENTS

| | | | |
|---|---|---|---|
| CN | 105095777 A | * | 11/2015 |
| CN | 113282896 A | * | 8/2021 |
| CN | 113505996 A | * | 10/2021 |
| CN | 116389369 A | * | 7/2023 |
| JP | 2020535543 A | * | 12/2020 |
| WO | WO-2017109791 A1 | * | 6/2017 |

OTHER PUBLICATIONS

Batra et al., Enabling the Deployment of ABAC Policies in RBAC Systems, Jan. 24, 2019, pp. 1-23 (Year: 2019).*

Steve Touw, Immuta, Modernizing From an RBAC to ABAC Model, Sep. 20, 2021, pp. 1-12 (Year: 2020).*

* cited by examiner

COMMON ACCESS MANAGEMENT ACROSS ROLE-BASED ACCESS CONTROL AND ATTRIBUTE-BASED ACCESS CONTROL

BACKGROUND OF THE INVENTION

Field of the Invention

The present invention relates to information handling systems. More specifically, embodiments of the invention provide for providing common access management solution across role-based access control (RBAC) model and attribute-based access control (ABAC) model.

Description of the Related Art

As the value and use of information continues to increase, individuals and businesses seek additional ways to process and store information. One option available to users is information handling systems. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As discussed, information handling systems run applications. The field of identity and access management (IAM) addresses what authorization is given to users of the applications. What are users able or needing to do with the applications and what are users authorized to do with the applications? IAM sits at the intersection of access control administrator of users, information security organizations, application teams, and user experience.

To provide for identity and access management of applications, two approaches can be used. The two approaches are role-based access control (RBAC) model and attribute-based access control (ABAC) model. Both models are defined by industry accepted standards. The RBAC model is defined by the INCITS 359-2012 (R2017) specification. The ABAC model is defined by the NIST.SP.800-162 specification.

The RBAC model employs pre-defined roles that carry a specific set of privileges associated with the roles and to which users are assigned the roles. In the RBAC model, access can be implicitly predetermined by an administrator assigning the roles to each user and explicitly by an object owner, such as an application team when determining privilege associated with each role.

The ABAC model provides for a method where a user requests to perform operations on objects and are granted or denied based on assigned attributes of the user, assigned attributes of the object, environment conditions, and a set of policies that are specified in terms of the assigned attributes and environment conditions.

Preexisting applications may be built and developed over considerable time and can be deeply rooted in the access control methods as defined by specific access control model (RBAC, ABAC). Migrating to a different access control model may not be practical or feasible. A challenge is to provide for a choice to administrators of the use of both the RBAC model and the ABAC model. It is desirable to ensure centralized visibility and policy controls to information security across both the RBAC model and the ABAC model. Application owners/teams should be allowed to continue to leverage existing access control of applications, whether the applications are built upon the RBAC model or the ABAC model. In addition, users have expectations to be able to authenticate once (e.g., directly or by single sign on). Users also expect to have consistent access to applications.

SUMMARY OF THE INVENTION

A computer-implementable method, system and computer-readable storage medium for providing common identity and access management of applications based on role-based access control (RBAC) model and access-based control (ABAC) model comprising: implementing a common model based on the ABAC model to support RBAC workflows and ABAC workflows; receiving the RBAC workflows through an RBAC management user interface; receiving the ABAC workflows through an ABAC management user interface, wherein the ABAC workflows are implemented by the common model based on the ABAC model; and converting the RBAC workflows to an ABAC model structure to be implemented by the common model based on the ABAC model.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide for system and methods for common access management that supports the role-based access control (RBAC) model and the attribute-based access control (ABAC) model and adhering to industry standards defining both of the models. Embodiments provide for an internal normalization of the RBAC and ABAC models to the ABAC specification. Implementations provide for two user interfaces that support administrative workflows and views. By leveraging the use of policies to a method to access rules, information security entities/organizations are provided the ability to establish cohesive policies across applications and given visibility of user access to the applications. Furthermore, implementations provide for RBAC and ABAC compatible application program interface (API) endpoints to allow users to access their applications that have been built using preexisting identity and access management (IAM) access control methods (i.e., RBAC or ABAC methods).

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
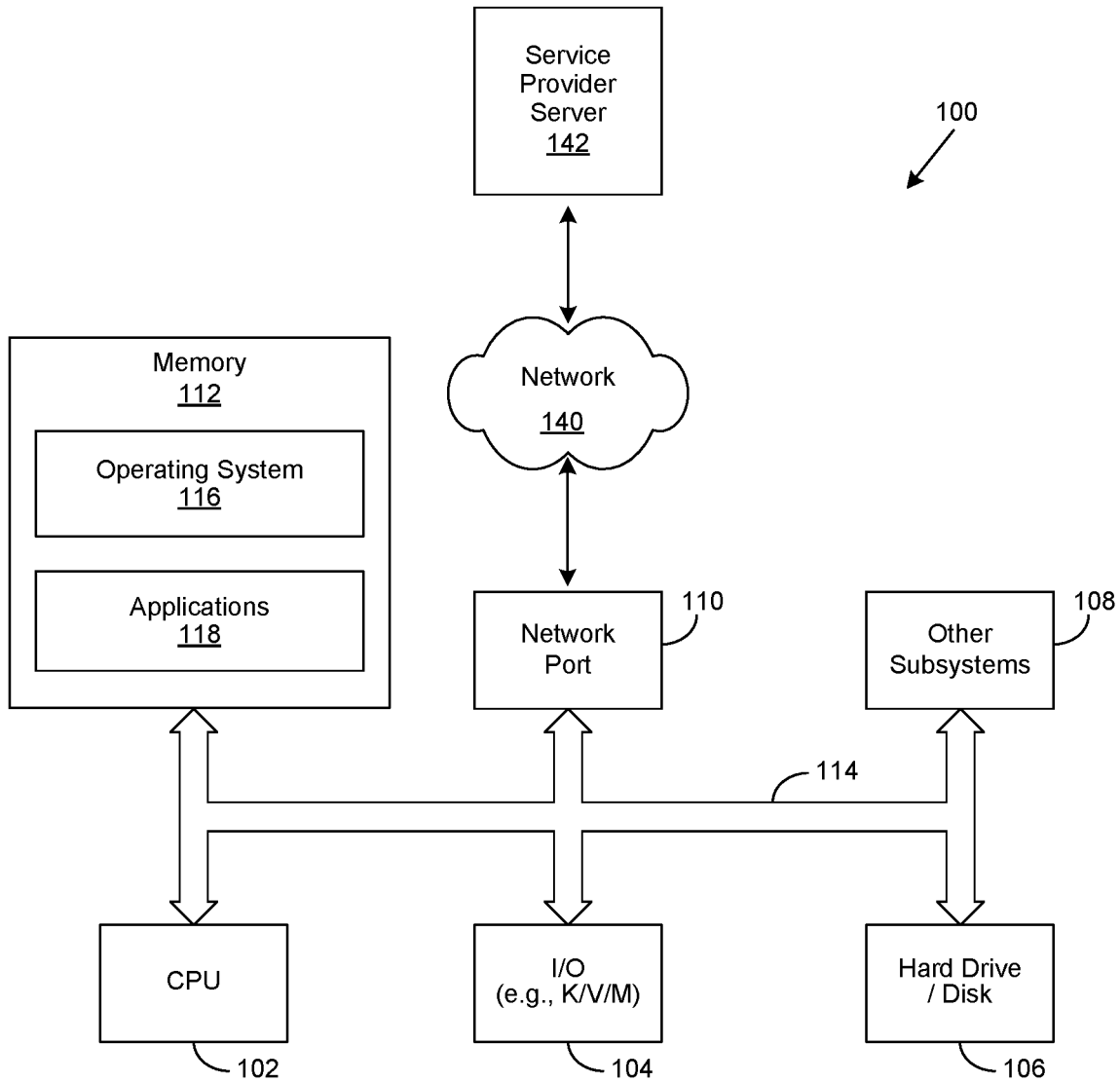
FIG. 1 is a general illustration of components of an information handling system as implemented in the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include applications 118. In certain implementations, the information handling system 100 may access use of the applications 118 from an external source, such as a website (e.g., online or remote applications). The applications 118 are further described herein as to identity and access management (IAM).

Figure 2A:
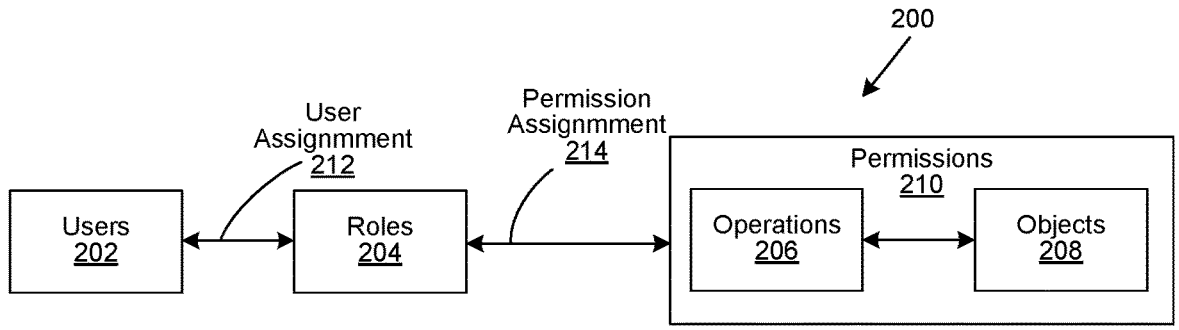
FIG. 2A illustrates a block diagram of a role-based access control (RBAC) model.

FIG. 2A shows a simplified block diagram 200 of a role-based access control (RBAC) model. The diagram 200 shows core RBAC model data elements and their interrelationships. The data elements include users 202, roles 204, operations 206, and permissions 210. Permissions 210 are relations of operations 206 to objects 208.

The RBAC model shown in the diagram 200 shows that users 202, such as individual users, are assigned to roles as represented by user assignment 212. Permissions 210 are assigned to roles as represented by permission assignment 214. Therefore, roles 204 is a means for designating multiple relationships between users 202 and permissions 210.

Figure 2B:
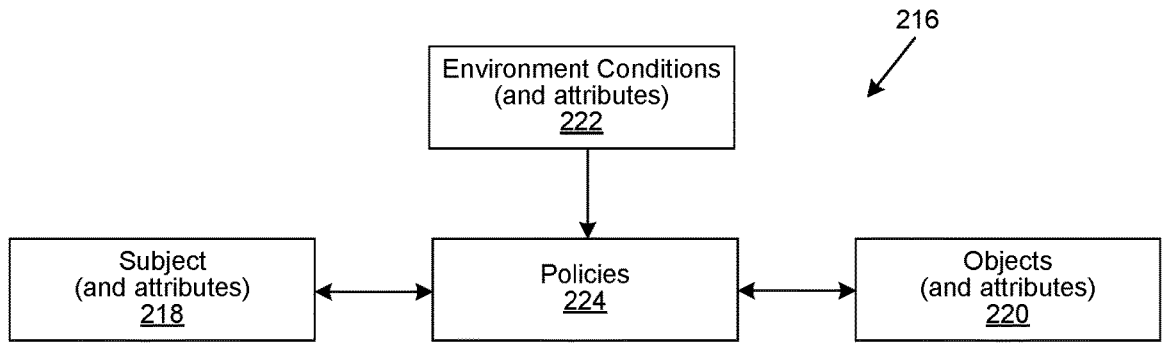
FIG. 2B illustrates a block diagram of an attribute-based access control (ABAC) model.

FIG. 2B shows a simplified block diagram 216 of an attribute-based access control (ABAC) model. The diagram 216 shows that the ABAC model provides for a subject 218 to request to perform operations on objects 220. Subjects 218 can be an actual person or non-person entity (NPE) such as device that performs operations on objects. Subjects 218 are assigned one or more attributes. Attributes are characteristics of the subject 218, object 220, or environment conditions 222. Implementations provide for attributes to contain information given by a name-value pair.

Subjects 218 are granted or denied requests to perform operations on objects 220 based on attributes of the subjects 218, assigned attributes to the objects 220, attributes of environment conditions 222, a set of policies 224 specified in terms of the attributes and conditions (i.e., environment conditions 222). Attributes are defined as characteristics of the subjects 218, objects 220, or environment conditions 222.

An object 220 can be a system resource for which access is managed by the ABAC model, such as devices, files, records, tables, processes, programs, networks, or domains containing or receiving information. An object 220 can be a resource or requested entity, as well as anything upon which an operation may be performed by a subject 218 including data, applications, services, devices, and networks. An operation is the execution of a function at the request of a subject 218 upon an object 220. Operations include read, write, edit, delete, copy, execute, and modify.

Policies 224 represent rules or relationships that allow for to determine if a requested access by a subject 218 is allowed, considering the values of the attributes of the subject 218, object 220, and environment conditions 222.

Figure 2C:
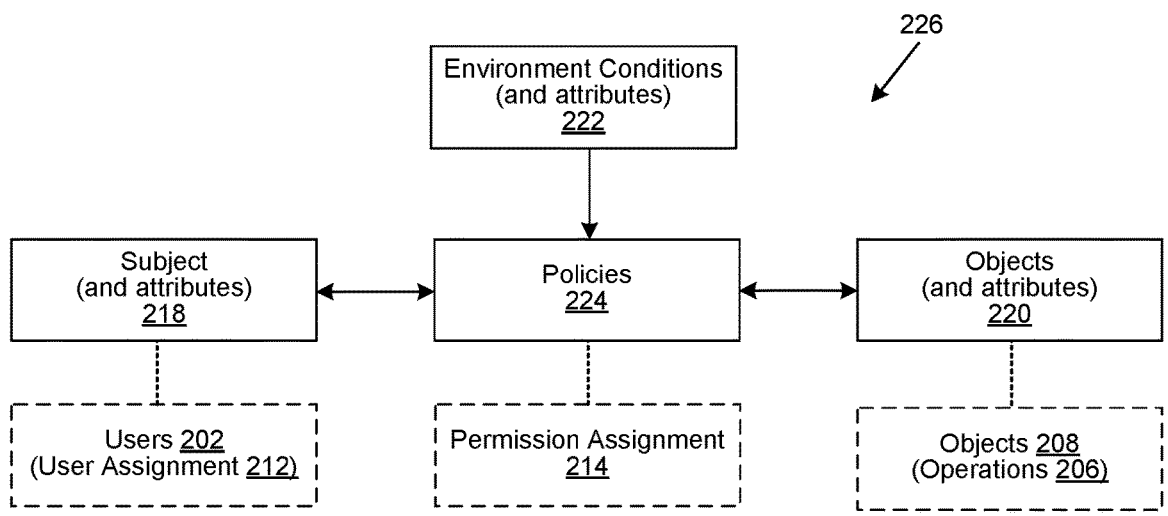
FIG. 2C illustrates a block diagram of a common model using attribute-based access control (ABAC)

FIG. 2C shows a simplified block diagram of a common model using attribute-based access control (ABAC). The RBAC model and elements described in FIG. 2A are represented in a common model based on the ABAC model and elements described in FIG. 2B. The common ABAC based model is represented by the diagram 226.

Users 202 are treated as subjects 222. Roles 204 are modeled as attributes of subjects 222. In cases where roles 204 are hierarchical, such hierarchical roles can be flattened/converted to an array of attribute values for a subject(s) 222. Such a treatment of roles 204 as attributes to subjects 222 (users 202) captures the concept of user assignment 212 as described in FIG. 2A.

As described in FIG. 2A, permission assignment 214 that associates permissions 210 across operations 206 and objects 208 is represented as policies 218 in the common ABAC model of FIG. 2C. Objects 208 map directly to objects 224, and operations 206 are considered as "attributes" of objects 224.

Therefore, the ABAC model as described in FIG. 2B is used as a common backend model as described in FIG. 2C in order to support persistence of preexisting IAM access control methods of applications.

Figure 3:
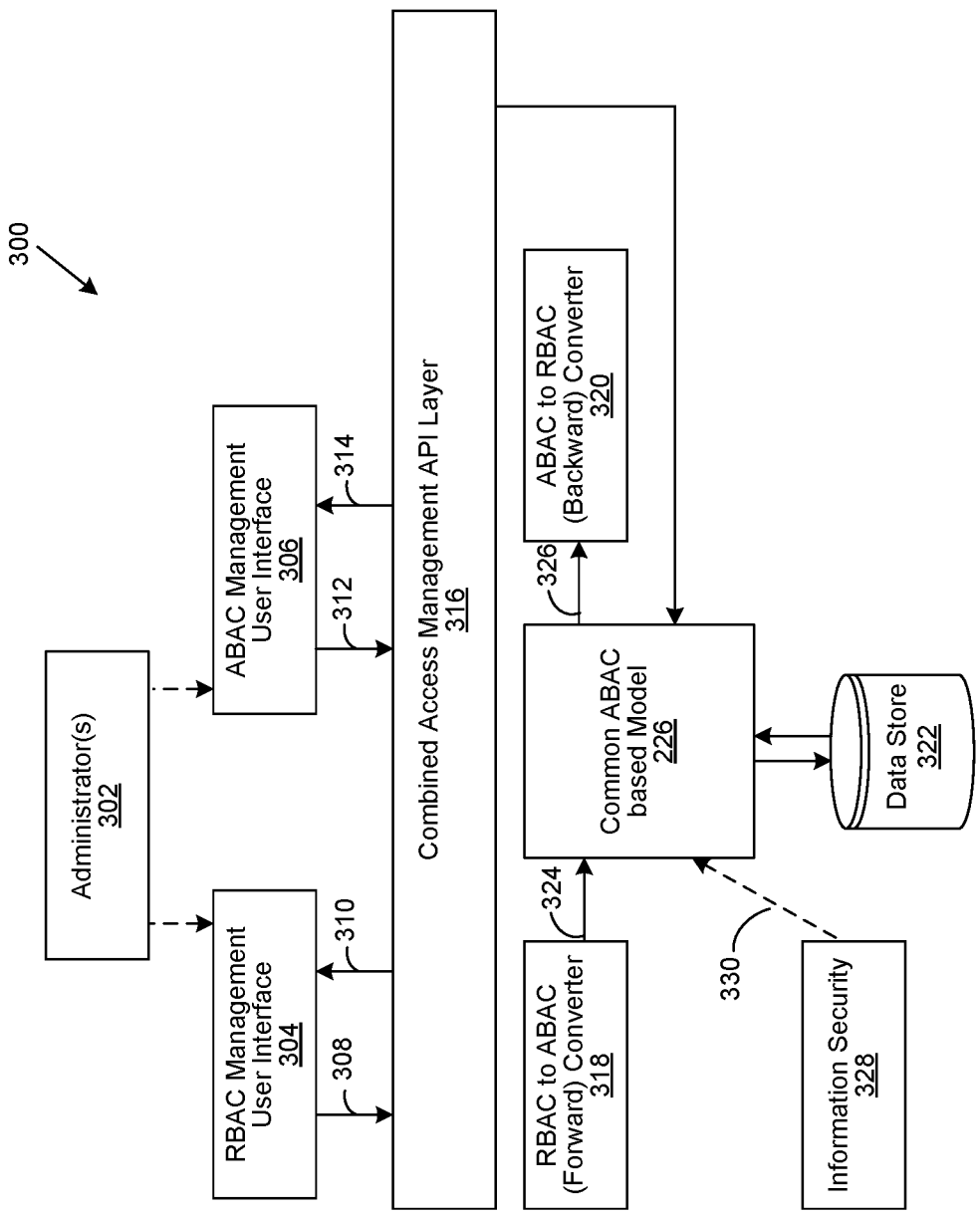
FIG. 3 illustrates a block diagram for administrative workflows for common identity and access management (IAM) access control management.

FIG. 3 shows a system for administrative workflows for common IAM access control management. The system 300 provides for account/application administration as represented by administrator(s) 302. Administrator(s) 302 represents an entity and device that manages workflow. The system 300 may be implemented as part of an information handling system, such as described in FIG. 1.

The system 300 allows administrator(s) 302 to manage using concepts and methods based on either the RBAC model or the ABAC model based on the needs/requirements of users. Implementations provide for two user interfaces for the administrator(s) 302, an RBAC management user interface 304 and an ABAC management user interface 306. The two user interfaces allow the administrator 302 to manage workflows.

The RBAC management user interface 304 provides for the administrator 302 to manage users 202, roles 204, and permissions 210 (operations 206 and objects 208). Furthermore, RBAC management user interface 304 allows the management of user assignments 212 (users 202 to roles 204), and permission assignments 214 (roles 204 to permissions 210. RBAC management user interface 304 supports hierarchal RBAC (role hierarchy), constrained RBAC, and static and dynamic separation of duty.

The ABAC management user interface 306 provides for the administrator 302 to manage subjects 218, objects 220, and environment conditions 222. Furthermore, the ABAC management user interface 306 provides allows the administrator 302 to manage attributes for the subjects 218, attributes for the objects 220, and attributes for environment conditions 222. ABAC management user interface also allows the administrator 302 to manage policies 224 (rules and relationships).

A write line 308 and read line 310 are provided for the RBAC management user interface 304. A write line 312 and read line 314 are provided for the ABAC management user interface 306. Communication is performed to a combined access management layer API layer 316. Workflows from the administration 302 do not require conversion and communicate directly with the combined access management layer API layer 316.

An RBAC to ABAC (forward) converter 318 and an ABAC to RBAC (backward) Converter 320 communicate with the combined access management layer API layer 316 and receive workflows.

When administrator(s) 302 uses RBAC workflows to create or update access management control of applications 118, implementations provide for the state to be captured in a "JSON" structure. The state can be persisted into an ABAC model-based backend data store 322. The RBAC to ABAC (forward) converter 318 converts from the RBAC "JSON" structure to the ABAC model based on constructs and mappings.

Implementations provide for an attribute name that is used for role assignment to be a reserved attribute. This avoids using the same attribute name for a different purpose in ABAC scenarios. The policies 224 as the result of the forward conversion are treated as a special type and are evaluated first during access control decision and enforcement.

The RBAC to ABAC (forward) converter 318 is configured to get user assignments 212 (users 202 to roles 204), users 202 which are treated as subjects 218, and roles 204 that are treated as attributes of a user(s) 202 (i.e., subjects 218). Implementations provide for attributes of roles 204 to be reserved as tag names. RBAC to ABAC (forward) converter 318 can further be configured to get permission assignments 214, create a "JSON" policy document (policies 224), and permissions (allowed operations 206 on objects 208). Environment conditions 222 can be set to null.

RBAC workflow that is converted to ABAC workflow representation to maintain persistence is represented by 324.

When administrator 303 requests RBAC workflows to read, ABAC to RBAC (backward) converter 320 converts from the ABAC persistent representation to the "JSON" RBAC representation. The ABAC to RBAC (backward) converter 320 receives from the common ABAC based model 226, workflow that has been converted back to RBAC representation that accommodates user experience for RBAC 326. The ABAC to RBAC (backward) converter 320 is configured to get user assignments 212 from subjects 218 attributes, and permission assignments 214 (roles 204 to permissions 210) from policies 224.

Information security organizations or information security 328 can have a cohesive view of users 202, policies 224, etc., by implementing the common ABAC based model 226, which as discussed in FIGS. 2B and 2C, includes users 202 and policies 224. Access to the ABAC based model 226 by information security 328 includes cohesive management/audit of policies 224 and of users 202. Information security 328 has a central policy store, regardless of the access control management model, which is across RBAC or ABAC. Information security 328 can audit users 202 and their associated permissions 210 by looking through a list of policies 224. Information security 328 can also modify and/or add policies 224 to enforce the principles of "zero-trust" (i.e., devices should not be trusted by default).

Figure 4:
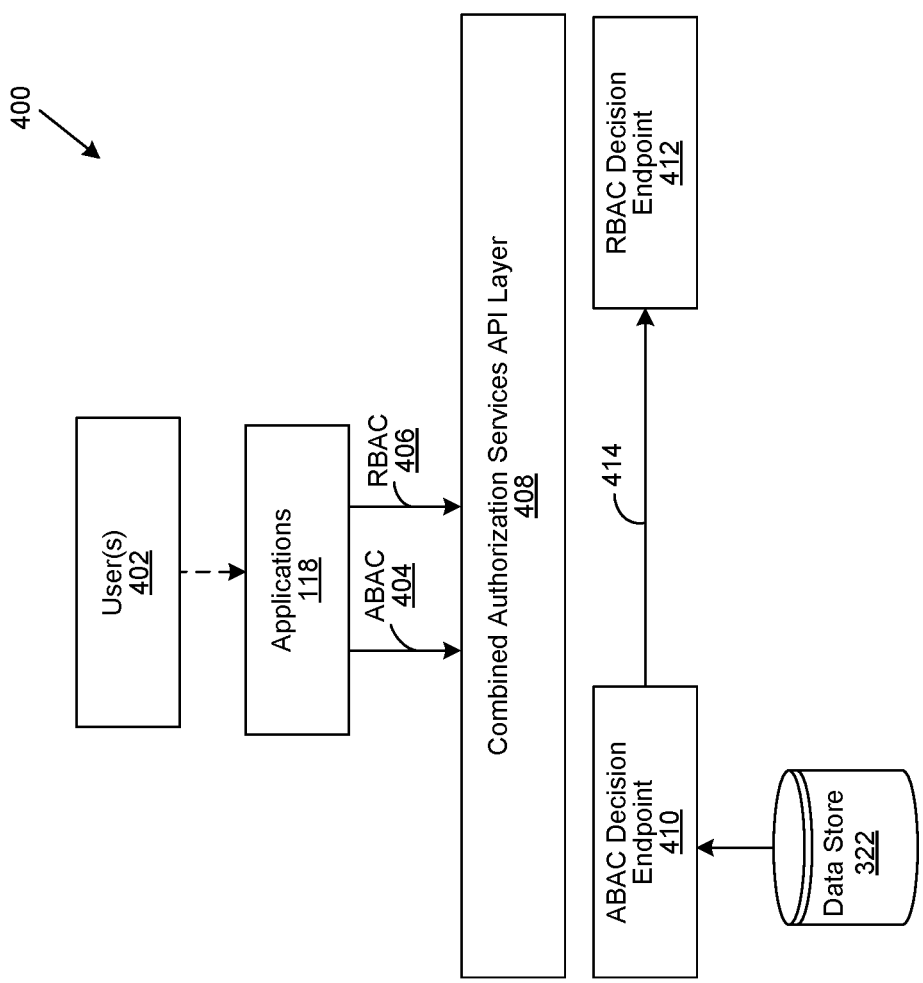
FIG. 4 illustrates a block diagram for application integration for common identity and access management (IAM) access control management.

FIG. 4 shows a system for application integration for common identity and access management (IAM) access control management. The system 400 allows for applications 118 to continue to leverage either the RBAC model or the ABAC model, for which the applications 118 were developed for. The system 400 may be implemented as part of an information handling system, such as described in FIG. 1.

Application teams/owners do not have to make structural changes to their applications 118 and can continue to work with either the RBAC model or ABAC model. Applications 118 do not have to externalize access control decision to an external API endpoint. If applications 118 are based on the RBAC model, in certain implementations a one-time migration can be performed of the user(s) 202, roles 204 and permissions 204 to the central repository or data store 322. Implementations provide for RBAC to ABAC (forward) converter 318 to be used for this purpose. If the applications 118 already use the ABAC model, migration can happen without any significant conversions.

The system 400 provides for user(s) 402. User(s) 402 include users 202 and represent an entity or device. User(s) 402 are interactive with applications 118 requesting access to a protected object (objects 208, objects 220).

Applications 118 can have ABAC based access control 404 or RBAC based access control 406. Applications 118 can publish an object (objects 208, objects 220) to ABAC model-based backend data store 322. Applications 118 can continue to use their RBAC based API integrations and can use ABAC evaluation. Communication is through a combined authorization services API layer 408.

Two API endpoints, ABAC decision endpoint 410 and RBAC decision endpoint 412 are created for applications 418 to leverage, based on whether an application(s) 418 uses the RBAC model or the ABAC model. Request and response structures conform to defined RBAC model specifications and ABAC model specifications.

A decision is executed by the ABAC decision endpoint 410, and if needed, adapted to the RBAC response in the case of RBAC integrations. In other word, ABAC decision endpoint 410 acts as a policy decision point (PDP) and computes access decisions. ABAC decision endpoint 410 also can act as a policy enforcement point (PEP) that enforces policy decisions in response to a request from a subject 218 (users 202) requesting access to a protected object 220 (object 208).

The RBAC decision endpoint 412 adapts the output 414 of the policy decision point (PDP) and policy enforcement point (PEP) of ABAC decision endpoint 410 to RBAC response structures.

Figure 5:
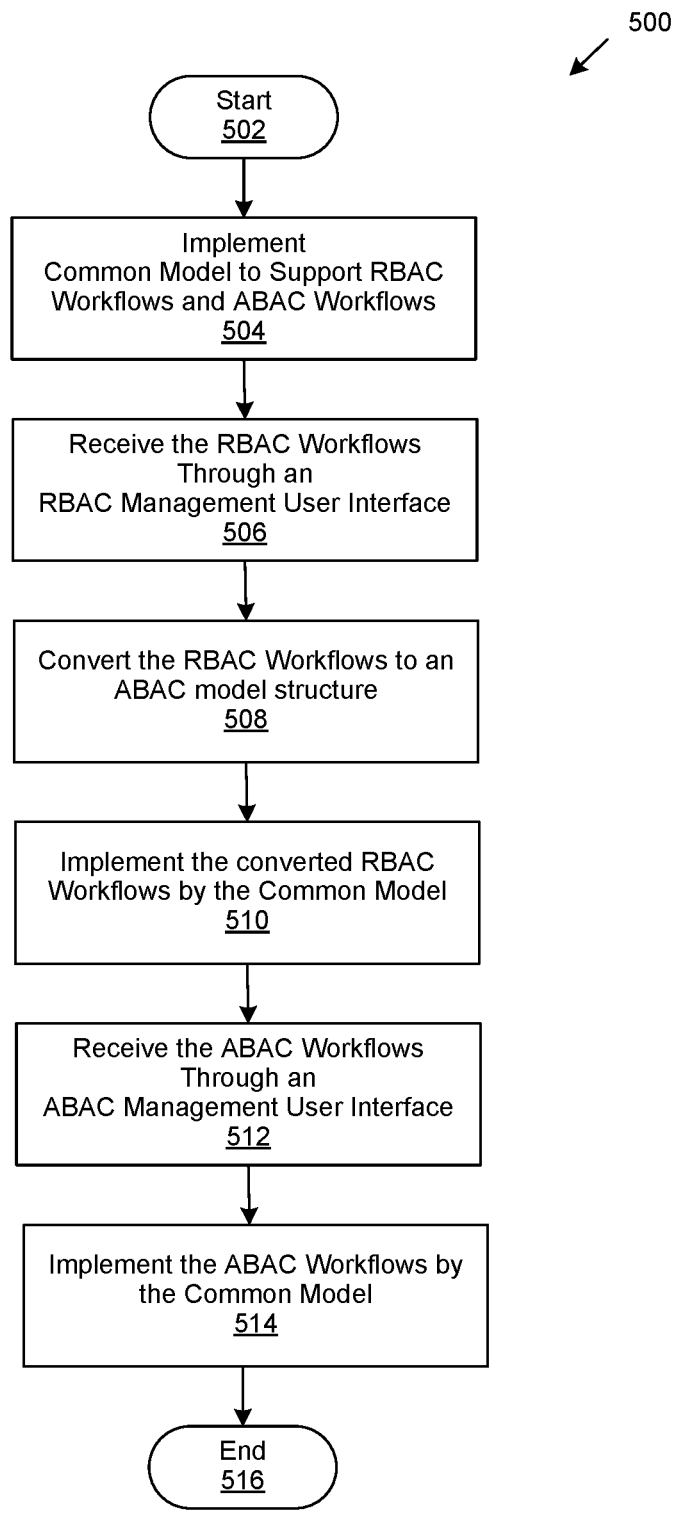
FIG. 5 is a generalized flowchart for providing common identity and access management of applications based on role-based access control (RBAC) model and access-based control (ABAC) model.

FIG. 5 is a generalized flowchart for providing common identity and access management of applications based on role-based access control (RBAC) model and access-based control (ABAC) model. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At step 502, the process 500 starts. A common model based on the ABAC model to support RBAC workflows and ABAC workflows implemented, such as common ABAC based model 226 described in FIG. 2C.

At step 506, RBAC workflows are received through RBAC management user interface 304. The received RBAC workflows are converted to an ABAC model structure. At step 510, the converted RBAC workflows are implemented by common model based on the ABAC model At step 512, ABAC workflows are received through ABAC management user interface 306. At step 514, the ABAC workflows are implemented by common model based on the ABAC model. At step 516, the process 500 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for providing common identity and access management of applications based on role-based access control (RBAC) model and attribute-based access control (ABAC) model comprising:
    implementing a common model based on the ABAC model to support RBAC workflows and ABAC workflows;
    receiving the RBAC workflows through an RBAC management user interface;
    receiving the ABAC workflows through an ABAC management user interface, wherein the ABAC workflows are implemented by the common model based on the ABAC model; and
    converting the RBAC workflows to an ABAC model structure to be implemented by the common model based on the ABAC model, wherein the applications are interactive with users requesting access to protected objects, wherein an ABAC decision endpoint and RBAC decision endpoint are provided for the applications to leverage, based on whether an application uses the RBAC model or the ABAC model, the RBAC decision endpoint adapts output of a policy decision point (PDP) and policy enforcement point (PEP) of the ABAC decision endpoint to RBAC response structures.

2. The computer-implementable method of claim 1, wherein the common model based on the ABAC model treats users of RBAC model as subjects of ABAC model, roles of RBAC model as attributes of ABAC model, permission assignments of RBAC model as policies of ABAC model, objects of RBAC model as objects of ABAC model, and operations of RBAC model as attributes of objects of ABAC model.

3. The computer-implementable method of claim 1, wherein the common model based on the ABAC model is accessed for information security regarding policies and users.

4. The computer-implementable method of claim 1, wherein the RBAC workflows state are converted to a JSON structure and persisted to an ABAC data store and converted to for use by the common model based on the ABAC model.

5. The computer-implementable method of claim 1, wherein an RBAC to ABAC (forward) converter is configured to get user assignments, users, and roles of the RBAC model.

6. The computer-implementable method of claim 1, wherein an ABAC to RBAC (backward) converter receives from the common model based on the ABAC model, workflow that has been converted back to RBAC representation.

7. A system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations for providing common identity and access management of applications based on role-based access control (RBAC) model and attribute based access control (ABAC) model and comprising instructions executable by the processor and configured for:
    implementing a common model based on the ABAC model to support RBAC workflows and ABAC workflows;
    receiving the RBAC workflows through an RBAC management user interface;
    receiving the ABAC workflows through an ABAC management user interface, wherein the ABAC workflows are implemented by the common model based on the ABAC model; and
    converting the RBAC workflows to an ABAC model structure to be implemented by the common model based on the ABAC model, wherein the applications are interactive with users requesting access to protected objects, wherein an ABAC decision endpoint and RBAC decision endpoint are provided for the applications to leverage, based on whether an application uses the RBAC model or the ABAC model, the RBAC decision endpoint adapts output of a policy decision point (PDP) and policy enforcement point (PEP) of the ABAC decision endpoint to RBAC response structures.

8. The system of claim 7, wherein the common model based on the ABAC model treats users of RBAC model as subjects of ABAC model, roles of RBAC model as attributes of ABAC model, permission assignments of RBAC model as policies of ABAC model, objects of RBAC model as objects of ABAC model, and operations of RBAC model as attributes of objects of ABAC model.

9. The system of claim 7, wherein the common model based on the ABAC model is accessed for information security regarding policies and users.

10. The system of claim 7, wherein the RBAC workflows state are converted to a JSON structure and persisted to an ABAC data store and converted to for use by the common model based on the ABAC model.

11. The system of claim 7, wherein an RBAC to ABAC (forward) converter is configured to get user assignments, users, and roles of the RBAC model.

12. The system of claim 7, wherein an ABAC to RBAC (backward) converter receives from the common model based on the ABAC model, workflow that has been converted back to RBAC representation.

13. A non-transitory, computer-readable storage medium embodying computer program code for providing common identity and access management of applications based on role-based access control (RBAC) model and attribute-based access control (ABAC) model, the computer program code comprising computer executable instructions configured for:
    implementing a common model based on the ABAC model to support RBAC workflows and ABAC workflows;
    receiving the RBAC workflows through an RBAC management user interface;
    receiving the ABAC workflows through an ABAC management user interface, wherein the ABAC workflows are implemented by the common model based on the ABAC model; and
    converting the RBAC workflows to an ABAC model structure to be implemented by the common model based on the ABAC model, wherein the applications are interactive with users requesting access to protected objects, wherein an ABAC decision endpoint and RBAC decision endpoint are provided for the applications to leverage, based on whether an application uses the RBAC model or the ABAC model, the RBAC decision endpoint adapts output of a policy decision point (PDP) and policy enforcement point (PEP) of the ABAC decision endpoint to RBAC response structures.

14. The non-transitory, computer-readable storage medium of claim 13, wherein the common model based on the ABAC model treats users of RBAC model as subjects of ABAC model, roles of RBAC model as attributes of ABAC model, permission assignments of RBAC model as policies of ABAC model, objects of RBAC model as objects of ABAC model, and operations of RBAC model as attributes of objects of ABAC model.

15. The non-transitory, computer-readable storage medium of claim 13, wherein the common model based on the ABAC model is accessed for information security regarding policies and users.

16. The non-transitory, computer-readable storage medium of claim 13, wherein an RBAC to ABAC (forward) converter is configured to get user assignments, users, and roles of the RBAC model.

17. The non-transitory, computer-readable storage medium of claim 13, wherein an ABAC to RBAC (backward) converter receives from the common model based on the ABAC model, workflow that has been converted back to RBAC representation.

\* \* \* \* \*